(12) United States Patent
Kim et al.

(10) Patent No.: US 9,475,937 B2
(45) Date of Patent: Oct. 25, 2016

(54) THERMOPLASTIC RESIN COMPOSITION AND MOLDED PRODUCT MADE USING THE SAME

(71) Applicant: Samsung SDI Co., Ltd., Yongin-si (KR)

(72) Inventors: Myunghun Kim, Uiwang-si (KR); Keehae Kwon, Uiwang-si (KR); Chang Min Hong, Uiwang-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 14/748,576

(22) Filed: Jun. 24, 2015

(65) Prior Publication Data
US 2015/0376402 A1   Dec. 31, 2015

(30) Foreign Application Priority Data
Jun. 27, 2014   (KR) .................. 10-2014-0080193

(51) Int. Cl.
*C08L 69/00*   (2006.01)
*C08L 51/04*   (2006.01)

(52) U.S. Cl.
CPC .............. *C08L 69/00* (2013.01); *C08L 51/04* (2013.01); *C08K 2201/005* (2013.01); *C08L 2666/24* (2013.01)

(58) Field of Classification Search
None
See application file for complete search history.

(56) References Cited

U.S. PATENT DOCUMENTS

| | | | |
|---|---|---|---|
| 4,460,742 A | 7/1984 | Kishida et al. | |
| 5,475,053 A | 12/1995 | Niessner et al. | |
| 6,423,767 B1 | 7/2002 | Weber et al. | |
| 8,557,912 B2 | 10/2013 | Chung et al. | |
| 8,735,490 B2 | 5/2014 | Chung et al. | |
| 2011/0003918 A1 | 1/2011 | Eckel et al. | |
| 2011/0157866 A1 | 6/2011 | Li et al. | |
| 2011/0160377 A1* | 6/2011 | Chung | C08L 25/12 524/504 |
| 2014/0187717 A1* | 7/2014 | Kwon | C08L 69/00 525/67 |

FOREIGN PATENT DOCUMENTS

| | | | |
|---|---|---|---|
| CN | 102115564 A | | 7/2011 |
| CN | 102329462 A | | 1/2012 |
| JP | 2001-226576 | * | 8/2001 |
| KR | 10-2003-0095537 A | | 12/2003 |
| KR | 10-0666797 B1 | | 1/2007 |
| KR | 2009-0029539 A | | 3/2009 |
| KR | 10-2011-0079489 A | | 7/2011 |
| KR | 10-2012-006839 A | | 1/2012 |
| KR | 10-2012-0078417 A | | 7/2012 |

OTHER PUBLICATIONS

Full translation of JP 2001-226576 into the English language (no date).*
Search Report in commonly owned Chinese Application No. 201310737841.6 dated Apr. 22, 2015, pp. 1-2.
Baek et al., electronic translation of KR 10-666797, Jan. 2007, pp. 1-6.
Non-Final Office Action in commonly owned U.S. Appl. No. 14/097,538 mailed Mar. 26, 2015, pp. 1-11.
Non-Final Office Action in commonly owned U.S. Appl. No. 14/097,538 mailed Aug. 11, 2015, pp. 1-6.
Final Office Action in commonly owned U.S. Appl. No. 14/097,538 mailed Nov. 23, 2015, pp. 1-7.
Notice of Allowance in commonly owned U.S. Appl. No. 14/097,538 mailed Mar. 30, 2016, pp. 1-9.

* cited by examiner

*Primary Examiner* — Marc Zimmer
(74) *Attorney, Agent, or Firm* — Additon, Higgins & Pendleton, P.A.

(57) ABSTRACT

A thermoplastic resin composition comprises (A) a polycarbonate resin; (B) a rubber-modified aromatic vinyl copolymer; and (C) a branched copolymer produced from a mixture that comprises a silicon compound having two or more unsaturated radicals. A molded product can be prepared using the composition.

14 Claims, No Drawings

THERMOPLASTIC RESIN COMPOSITION AND MOLDED PRODUCT MADE USING THE SAME

CROSS-REFERENCE TO RELATED APPLICATION

This application claims the benefit of priority under 35 U.S.C. §119(a) of Korean Patent Application No. 10-2014-0080193, filed on Jun. 27, 2014, in the Korean Intellectual Property Office, the entire disclosure of which is incorporated herein by reference for all purposes.

FIELD

The present invention relate to a thermoplastic resin composition and a molded product made using the same.

BACKGROUND

Thermoplastic resins have a lower specific gravity than glass or metal and can have excellent mechanical properties such as excellent moldability and impact resistance. Plastic products made using such thermoplastic resins are quickly replacing conventional glass and metal products in fields such as electric and electronic products and automobile components.

There is a growing demand by users for products with a less glossy, or matte, appearance. Especially, materials with low gloss or no gloss are increasingly being used in plastic materials for interior and exterior automobile components, in order to provide a luxurious appearance and touch.

Matte paint can be used to reduce gloss. There can, however, be environmental concerns associated with the same. Also, painting processes can increase production costs.

Conventionally low gloss resins are produced by adding a certain type of rubber substance to the resins or by reforming the resins. However, such methods can be problematic in that they may provide insufficient gloss-reducing effect, and that they may deteriorate impact strength and heat resistance.

As an alternative, a method of graft-polymerizing a monomer such as an ethylene-unsaturated carboxylic acid to a resin has been used. This method, however, can significantly deteriorate heat resistance although providing good overall properties.

Korean patent laid-open publication No. 2009-0029539 relates to a styrene resin composition wherein a syndiotactic polystyrene resin is used as a deglossing agent. This deglossing agent has a three-dimensional syndiotactic structure wherein phenyl radicals or substituted phenyl radicals that are side branches are disposed in opposite directions to one another on a backbone formed by carbon-carbon bonds. Unlike amorphous polystyrene, this type of deglossing agent has crystalline characteristics that make it possible to provide matting characteristics. However, the aforementioned deglossing agent can deteriorate flowability and molding processibility, and thus can deteriorate appearance characteristics and mechanical properties such as impact resistance and the like.

U.S. Pat. No. 4,460,742 relates to a low gloss resin composition including a cross-linked copolymer. Large caliber rubber particles or a matting agent are added to provide a matting effect. However, this can require a large amount of matting agent, can deteriorate impact strength and the like, and also can increase processing costs due to the need to use cast erosion.

Therefore, in order to resolve the aforementioned problems, there is a growing need to develop a thermoplastic resin composition that has excellent matting characteristics while not deteriorating impact strength.

SUMMARY

Therefore, a purpose of various embodiments of the present disclosure is to resolve the aforementioned problems of conventional technologies, that is, to provide a thermoplastic resin composition that is capable of maintaining excellent impact strength while providing excellent matting characteristics without the use of an additional matting agent by using a branched copolymer prepared by using a new type of silicon compound as a cross-linking agent, and a molded product prepared from the same.

Furthermore, another purpose of various embodiments of the present disclosure is to achieve a reinforcement of impact strength and a maximization of matting effect by mixing two types of rubber-modified aromatic vinyl copolymers in an optimal ratio.

An embodiment of the present disclosure provides a thermoplastic resin composition comprising (A) a polycarbonate resin; (B) a rubber-modified aromatic vinyl copolymer; and (C) a branched copolymer produced from a mixture that comprises a silicon compound having two or more unsaturated radicals.

The branched copolymer (C) may be produced from a mixture comprising about 0.1 to about 10 parts by weight of a silicon compound (C-3) having two or more unsaturated radicals, based on about 100 parts by weight of a monomer mixture comprising about 60 to about 80 weight % of an aromatic vinyl compound (C-1) and about 20 to about 40 weight % of an unsaturated nitrile compound (C-2).

The silicon compound (C-3) may be represented by Chemical Formula 1:

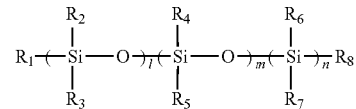

wherein, each of l, m and n is the same or different and each is independently an integer of 0 to 100 (but, l, m and n are not all 0 at the same time); each of $R_1$ to $R_8$ is the same or different and each is independently hydrogen, substituted or unsubstituted $C_1$ to $C_{30}$ alkyl, substituted or unsubstituted $C_2$ to $C_{30}$ alkenyl, substituted or unsubstituted $C_2$ to $C_{30}$ alkynyl, substituted or unsubstituted $C_3$ to $C_{30}$ cycloalkyl, substituted or unsubstituted $C_6$ to $C_{30}$ aryl, substituted or unsubstituted $C_1$ to $C_{30}$ heteroaryl, hydroxyl, alkoxyl, amino, epoxy, carboxyl, halogen, ester, isocyanate, or mercapto group; with the proviso that at least two of $R_1$ to $R_8$ include an unsaturated radical that may be polymerized; and the compound has a linear or ring structure.

The silicon compound (C-3) may be represented by Chemical Formula 2:

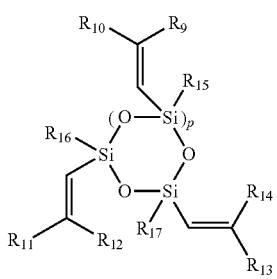

wherein, each of $R_9$ to $R_{14}$ is the same or different and each is independently substituted or unsubstituted $C_1$ to $C_{20}$ alkyl, substituted or unsubstituted $C_2$ to $C_{20}$ alkenyl, or substituted and unsubstituted $C_6$ to $C_{20}$ aryl; each of $R_{15}$ to $R_{17}$ is the same or different and each is independently hydrogen or substituted or unsubstituted $C_1$ to $C_6$ alkyl, and p is an integer of 1 to 6.

The silicon compound (C-3) may comprise 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, or a mixture thereof.

The branched copolymer (C) may be produced by further adding one or more multifunctional vinyl compounds comprising divinyl polydimethylsiloxane, vinyl modified dimethylsiloxane, divinybenzene, ethylene glycol di(meth)acrylate, allyl(meth)acrylate, diallyl phthalate, diallyl malate, triallyl isocyanurate, or a mixture thereof, to the mixture.

The aromatic vinyl compound (C-1) may comprise styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, or a mixture thereof.

The unsaturated nitrile compound (C-2) may comprise acrylonitrile, methacrylonitrile, ethacrylonitrile, phenylacrylonitrile, α-chloroacrylonitrile, fumaronitrile, a mixture thereof.

The rubber-modified aromatic vinyl copolymer (B) may comprise a first rubber-modified aromatic vinyl copolymer (B-1) comprising a rubber polymer with an average particle size of about 200 to about 400 nm; and a second rubber-modified aromatic vinyl copolymer (B-2) comprising a rubber polymer with an average particle size of about 400 to about 800 nm.

The rubber-modified aromatic vinyl copolymer (B) may comprise about 25 to about 75 weight % of the first rubber-modified aromatic vinyl copolymer (B-1), and about 25 to about 75 weight % of the second rubber-modified aromatic vinyl copolymer (B-2), based on the total weight (100 weight %) of the rubber-modified aromatic vinyl copolymer (B).

The first rubber-modified aromatic vinyl copolymer (B-1) may comprise about 30 to about 60 weight % of rubber polymer based on the total weight (100 weight %) of the first rubber-modified aromatic vinyl copolymer (B-1), and the second rubber-modified aromatic vinyl copolymer (B-2) may comprise about 5 to about 20 weight % of rubber polymer based on the total weight (100 weight %) of the second rubber-modified aromatic vinyl copolymer (B-2).

The thermoplastic resin composition may comprise about 50 to about 70 weight % of polycarbonate resin (A), about 20 to about 30 weight % of rubber-modified aromatic vinyl copolymer (B), and about 1 to about 30 weight % of branched copolymer (C).

Another embodiment of the present disclosure provides a molded product using a thermoplastic resin composition of the present disclosure, and the molded product may comprise about 0.01 to about 3 weight % of silicon compound (C-3).

A gloss of the molded product measured at an angle of 60° by an evaluation method according to ASTM D523 may be about 20 to about 60%.

In various exemplary embodiments of the present disclosure, it is possible to provide excellent matting characteristics with minimal or no deterioration of properties such as impact resistance and/or heat resistance by applying an optimized branched copolymer to a thermoplastic resin composition that comprises a polycarbonate resin and a rubber-modified aromatic vinyl copolymer.

Furthermore, in exemplary embodiments, it is possible to maintain excellent impact strength while providing excellent matting characteristics even without an additional matting agent by adding a branched copolymer comprising a new type of silicon compound cross-linking agent to a thermoplastic resin composition.

Furthermore, in exemplary embodiments, it is possible to realize a reinforcement of impact strength and/or a maximization of matting effect by mixing two types of rubber-modified aromatic vinyl copolymers in an optimal ratio.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinbelow, explanation will be made on a thermoplastic resin composition according to the present disclosure and a molded product using the same.

The thermoplastic resin composition of the present disclosure may comprise a polycarbonate resin (A), rubber-modified aromatic vinyl copolymer (B), and branched copolymer (C). These components can provide excellent impact strength and/or matting characteristics. Each of these components will be explained in detail hereinbelow.

The thermoplastic resin composition of the present disclosure may comprise about 50 to about 70 weight % of polycarbonate resin (A), about 20 to about 30 weight % of rubber-modified aromatic vinyl copolymer (B), and about 1 to about 30 weight % of branched copolymer (C), wherein the amount of each of (A), (B), and (C) is based on the total weight (100 weight %) of the thermoplastic resin composition. In exemplary embodiments, the thermoplastic resin composition of the present disclosure may comprise about 50 to about 65 weight % of polycarbonate resin (A), about 20 to about 30 weight % of rubber-modified aromatic vinyl copolymer (B), and about 5 to about 30 weight % of branched copolymer (C).

In some embodiments, the thermoplastic resin composition may comprise polycarbonate resin (A) in an amount of about 50, 51, 52, 53, 54, 55, 56, 57, 58, 59, 60, 61, 62, 63, 64, 65, 66, 67, 68, 69, or 70 weight %. Further, according to some embodiments of the present invention, the amount of polycarbonate resin (A) can be in a range from about any of the foregoing amounts to about any other of the foregoing amounts.

In some embodiments, the thermoplastic resin composition may comprise rubber-modified aromatic vinyl copolymer (B) in an amount of about 20, 21, 22, 23, 24, 25, 26, 27, 28, 29, or 30 weight %. Further, according to some embodiments of the present invention, the amount of rubber-modified aromatic vinyl copolymer (B) can be in a range from about any of the foregoing amounts to about any other of the foregoing amounts.

In some embodiments, the thermoplastic resin composition may comprise branched copolymer (C) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 weight %. Further, according to some embodiments of the present invention, the amount of branched copolymer (C) can be in a range from about any of the foregoing amounts to about any other of the foregoing amounts.

When within the aforementioned ranges, the thermoplastic resin composition of the present disclosure may maximize the impact strength and/or matting characteristics.

(A) Polycarbonate Resin

The polycarbonate resin used in the present disclosure may be an aromatic polycarbonate resin produced by reacting a diphenol represented by Chemical Formula I below with phosgene, halogen formate, and/or carbonic acid diester.

[Chemical Formula 1]

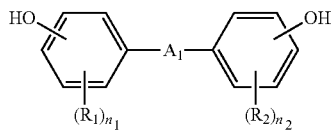

wherein, $A_1$ is a single bond, substituted or unsubstituted $C_1$ to $C_5$ alkylene, substituted or unsubstituted $C_1$ to $C_5$ alkylidene, substituted or unsubstituted $C_3$ to $C_6$ cycloalkylene, substituted or unsubstituted $C_5$ to $C_6$ cycloalkylidene, CO, S, or $SO_2$; each of $R_1$ and $R_2$ is the same or different and each is independently substituted or unsubstituted $C_1$ to $C_{30}$ alkyl or substituted or unsubstituted $C_6$ to $C_{30}$ aryl; and each of $n_1$ and $n_2$ is the same or different and each is independently an integer of 0 to 4.

As used herein, unless otherwise defined, the term "substituted" means that a hydrogen atom has been substituted by a halogen radical, $C_1$ to $C_{30}$ alkyl, $C_1$ to $C_{30}$ haloalkyl, $C_6$ to $C_{30}$ aryl, $C_2$ to $C_{30}$ heteroaryl, $C_1$ to $C_{20}$ alkoxy, or a combination thereof.

Examples of the diphenol may include without limitation hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and mixtures thereof. In exemplary embodiments, 2,2-bis-(4-hydroxyphenyl)-propane, 2,2-bis-(3,5-dichloro-4-hydroxyphenyl)-propane, and/or 1,1-bis-(4-hydroxyphenyl)-cyclohexane, for example, 2,2-bis-(4-hydroxyphenyl)-propane (also called bisphenol-A), may be used.

The polycarbonate resin used in the present disclosure may have a weight average molecular weight (Mw) of about 10,000 to about 200,000 g/mol, for example, a weight average molecular weight (Mw) of about 15,000 to about 80,000 g/mol, but without limitation.

The polycarbonate resin used in the present disclosure may be a polycarbonate resin having a branched-chain. For example, the polycarbonate resin may be produced by adding a tri- or higher multifunctional compound, for example, a compound with trivalent or more phenol radicals, in an amount of about 0.05 to about 2 mol % based on the total mol % of diphenol used in the polymerization.

The polycarbonate resin used in the present disclosure may comprise a homopolycarbonate resin and/or a copolycarbonate resin. Also, a blend of one or more copolycarbonate resins and/or one or more homopolycarbonate resins may be used.

Some or an entirety of the aforementioned polycarbonate resin of the present disclosure may be replaced by an aromatic polyester-carbonate resin obtained through a polymerization reaction in the presence of an ester precursor, for example, a difunctional carboxylic acid.

(B) Rubber-Modified Aromatic Vinyl Copolymer

The rubber-modified aromatic vinyl copolymer used in the present disclosure may be a resin polymer in which a grafted rubber polymer exists as dispersed particles in a matrix (continuous phase) including a copolymer of vinyl monomers. Such a rubber-modified aromatic vinyl copolymer may be produced by adding an aromatic vinyl monomer and a vinyl monomer that may be copolymerized with the aromatic vinyl monomer in the presence of a rubber polymer, and polymerizing the same. Such a rubber-modified aromatic vinyl copolymer may be produced by known polymerization methods such as emulsion polymerization, solution polymerization, suspension polymerization, and mass polymerization.

In exemplary embodiments, the aforementioned rubber-modified aromatic vinyl copolymer may be produced by producing an aromatic vinyl graft copolymer with a high rubber polymer amount and an aromatic vinyl copolymer with no rubber polymer separately, and then melt-mixing the two aromatic vinyl copolymers in a suitable manner according to the purpose of use. However, when using the mass polymerization method, the rubber-modified aromatic vinyl copolymer may be produced through a continuous reaction process without producing an aromatic vinyl graft copolymer and an aromatic vinyl copolymer without rubber polymer separately.

Examples of the rubber-modified aromatic vinyl copolymer used in the present disclosure include without limitation an acrylonitrile-butadiene-styrene copolymer resin (ABS), acrylonitrile-styrene-acrylate copolymer resin (ASA), acrylonitrile-ethylene propylene rubber-styrene copolymer resin (AES), methyl methacrylate-butadiene-styrene copolymer resin (MBS) and the like, and mixtures thereof.

The rubber-modified aromatic vinyl copolymer may comprise the graft copolymer solely, or may comprise a combination of the graft copolymer with the aromatic vinyl copolymer (without the rubber polymer), wherein the combining ratio may be determined based on the compatibility of components.

Hereinbelow, a first rubber-modified aromatic vinyl copolymer (B-1) and a second rubber-modified aromatic vinyl copolymer (B-2) that can be components of the rubber-modified aromatic vinyl copolymer (B) will be explained in detail.

The rubber-modified aromatic vinyl copolymer (B) may comprise about 25 to about 75 weight % of first rubber-modified aromatic vinyl copolymer (B-1), and about 25 to about 75 weight % of second rubber-modified aromatic vinyl copolymer (B-2), each based on 100 weight % of the rubber-modified aromatic vinyl copolymer (B).

In some embodiments, the rubber-modified aromatic vinyl copolymer (B) may comprise the first rubber-modified aromatic vinyl copolymer (B-1) in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 weight %. Further, according to some embodiments of the present invention, the amount of the first rubber-modified aromatic vinyl copolymer (B-1) can be in a range from about any of the foregoing amounts to about any other of the foregoing amounts.

In some embodiments, the rubber-modified aromatic vinyl copolymer (B) may comprise the second rubber-modified aromatic vinyl copolymer (B-2) in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 weight %. Further, according to some embodiments of the present invention, the amount of the second rubber-modified aromatic vinyl copolymer (B-2) can be in a range from about any of the foregoing amounts to about any other of the foregoing amounts.

In exemplary embodiments, the weight ratio of the first rubber-modified aromatic vinyl (B-1) to the second rubber-modified aromatic vinyl copolymer (B-2) may be about 2:1 to about 3:1.

When within the aforementioned range, the rubber-modified aromatic vinyl copolymer (B) may provide an optimal particle size distribution of the rubber polymer and an optimal rubber polymer weight ratio to the thermoplastic resin composition, and may thereby maximize the impact strength and/or matting characteristics of the thermoplastic resin composition.

(B-1) The First Rubber-Modified Aromatic Vinyl Copolymer

The first rubber-modified aromatic vinyl copolymer used in the present disclosure may be produced by adding an aromatic vinyl monomer that may be graft-copolymerized with a rubber copolymer and a monomer that may be copolymerized with the aromatic vinyl monomer, and then polymerizing the same.

Examples of the rubber polymer that may be used in the first rubber-modified aromatic vinyl copolymer include without limitation diene rubbers such as polybutadiene, styrene-butadiene copolymer, and acrylonitrile-butadiene copolymer; saturated rubbers which are hydrogenated diene rubbers; isoprene rubbers; acrylic rubbers such as butyl (meth)acrylate; ethylene/propylene/diene monomer (EPDM) ternary copolymers; and the like, and mixtures thereof. In exemplary embodiments, the rubber polymer can include polybutadiene.

The first rubber-modified aromatic vinyl copolymer (B-1) may comprise the rubber polymer in an amount of about 30 to about 60 weight %, for example, about 40 to about 60 weight %, based on the total weight (100 weight %) of the first rubber-modified aromatic vinyl copolymer (B-1). In some embodiments, the first rubber-modified aromatic vinyl copolymer (B-1) may comprise the rubber polymer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 weight %. Further, according to some embodiments of the present invention, the amount of rubber polymer can be in a range from about any of the foregoing amounts to about any other of the foregoing amounts. This amount can provide good impact strength.

Furthermore, the first rubber-modified aromatic vinyl copolymer may comprise a rubber polymer with an average particle size of about 200 to about 400 nm. This reduced particle size can increase the amount of the rubber polymer, and thereby can reinforce impact strength.

Herein, the particle size of a rubber polymer particle may be expressed by an average size of a group, the average size being digitized by a measurement method, but there are also a mode diameter that represents a maximum value of a distribution, a median diameter that corresponds to a median value of an integral calculus distribution curve, and various average diameters (number average, length average, area average, mass average, volume average and the like) that are more commonly used. In the present disclosure, however, an average particle size refers to a number average diameter that is a measurement of D50 (a particle size of the point where the distribution rate is 50%) unless expressed otherwise.

Examples of the aromatic vinyl monomer that may be graft-copolymerized with the rubber polymer include without limitation styrene, α-methyl styrene, nuclear substituted styrene, and the like, and mixtures thereof. In exemplary embodiments, the aromatic vinyl monomer can include styrene.

Examples of the monomer that may be copolymerized with the aromatic vinyl monomer include without limitation acrylonitrile, methacrylonitrile, methylmethacrylate, N-substituted maleimide, maleic anhydride, and the like, and mixtures thereof. In exemplary embodiments, the monomer that may be copolymerized with the aromatic vinyl monomer may include acrylonitrile.

(B-2) The Second Rubber-Modified Aromatic Vinyl Copolymer

The second rubber-modified aromatic vinyl copolymer used in the present disclosure can be the same as the first rubber-modified aromatic vinyl copolymer aforementioned except for the average particle size and amount of the rubber polymer, and it may be a mixture of an aromatic vinyl copolymer and a rubber-modified aromatic vinyl graft copolymer, for example, a g-ABS or ABS resin.

The second rubber-modified aromatic vinyl copolymer (B-2) may comprise the rubber polymer in an amount of about 5 to about 20 weight %, for examples, about 10 to about 17 weight %, based on the total weight (100 weight %) of the second rubber-modified aromatic vinyl copolymer. In some embodiments, the second rubber-modified aromatic vinyl copolymer (B-2) may comprise the rubber polymer in an amount of about 5, 6, 7, 8, 9, 10, 11, 12, 13, 14, 15, 16, 17, 18, 19, or 20 weight %. Further, according to some embodiments of the present invention, the amount of rubber polymer can be in a range from about any of the foregoing amounts to about any other of the foregoing amounts.

The second rubber-modified aromatic vinyl copolymer may comprise a rubber polymer with an average particle size is about 400 to about 800 nm. This increased particle size can help reinforce low temperature impact strength and matting characteristics.

Generally the rubber polymer of the first rubber-modified aromatic vinyl copolymer and the rubber polymer of the second rubber-modified aromatic vinyl copolymer have different average particle sizes.

Furthermore, the second rubber-modified aromatic vinyl copolymer may comprise about 10 to about 30 weight % of a rubber-modified aromatic vinyl graft copolymer and about 70 to about 90 weight % of aromatic vinyl copolymer.

In some embodiments, the second rubber-modified aromatic vinyl copolymer (B-2) may comprise the rubber-modified aromatic vinyl graft copolymer in an amount of about 10, 11, 12, 13, 14, 15, 16, 17, 18, 19, 20, 21, 22, 23, 24, 25, 26, 27, 28, 29 or 30 weight %. Further, according to some embodiments of the present invention, the amount of the rubber-modified aromatic vinyl graft copolymer can be in a range from about any of the foregoing amounts to about any other of the foregoing amounts.

In some embodiments, the second rubber-modified aromatic vinyl copolymer (B-2) may comprise the aromatic vinyl copolymer in an amount of about 70, 71, 72, 73, 74, 75, 76, 77, 78, 79, 80, 81, 82, 83, 84, 85, 86, 87, 88, 89, or 90 weight %. Further, according to some embodiments of the present invention, the amount of the aromatic vinyl copolymer can be in a range from about any of the foregoing amounts to about any other of the foregoing amounts.

(C) Branched Copolymer

The branched copolymer used in the thermoplastic resin composition of the present disclosure may be produced from a mixture that comprises an aromatic vinyl compound (C-1), an unsaturated nitrile compound (C-2), and a silicon compound having two or more unsaturated radicals (C-3).

Hereinbelow, each component will be explained in more detail.

(C-1) Aromatic Vinyl Compound

Examples of the aromatic vinyl compound may include without limitation styrene, α-methylstyrene, β-methylstyrene, p-methylstyrene, p-t-butyl styrene, ethylstyrene, vinylxylene, monochlorostyrene, dichlorostyrene, dibromostyrene, vinylnaphthalene, and the like, and mixtures thereof.

In exemplary embodiments, the aromatic vinyl compound may include styrene, α-methylstyrene, or a mixture thereof.

The branched copolymer may comprise the aromatic vinyl compound in an amount of about 60 to about 80 weight %, based on the total weight (100 weight %) of a monomer mixture including the aromatic vinyl compound and the unsaturated nitrile compound for producing the branched copolymer. In some embodiments, the branched copolymer may comprise the aromatic vinyl compound in an amount of about 60, 61, 62, 63, 64, 65, 66, 67, 68, 69, 70, 71, 72, 73, 74, 75, 76, 77, 78, 79, or 80 weight %. Further, according to some embodiments of the present invention, the amount of the aromatic vinyl copolymer can be in a range from about any of the foregoing amounts to about any other of the foregoing amounts.

When within this range, the aromatic vinyl compound may improve the impact strength and/or heat resistance of the thermoplastic resin composition of the present disclosure.

(C-2) Unsaturated Nitrile Compound

Examples of the unsaturated nitrile compound may include without limitation acrylonitrile, methacrylonitrile, ethacrylonitrile, phenylacrylonitrile, α-chloroacrylonitrile, fumaronitrile, and the like, and mixtures thereof.

In exemplary embodiments, the unsaturated nitrile compound may include acrylonitrile.

The branched copolymer may comprise the unsaturated nitrile compound in an amount of about 20 to about 40 weight %, based on the total weight (100 weight %) of a monomer mixture including the aromatic vinyl compound and the unsaturated nitrile compound for producing the branched copolymer. In some embodiments, the branched copolymer may comprise the unsaturated nitrile compound in an amount of about 20, 21, 22, 23, 24, 25, 26, 27, 28, 29 30, 31, 32, 33, 34, 35, 36, 37, 38, 39, or 40 weight %. Further, according to some embodiments of the present invention, the amount of the unsaturated nitrile copolymer can be in a range from about any of the foregoing amounts to about any other of the foregoing amounts.

The weight ratio of the aromatic vinyl compound to the unsaturated nitrile compound may be about 7:3 to about 9:1. When within this range, the unsaturated nitrile compound, in combination with other substances, may improve the matting characteristics with minimal or no deterioration of the mechanical properties and/or molding processability of the thermoplastic resin composition.

(C-3) Silicon Compound

The silicon compound having two or more unsaturated radicals may be used to realize excellent matting characteristics while maintaining general properties such as impact resistance and heat resistance.

The silicon compound having two or more unsaturated radicals may comprise one or a mixture of two or more compounds represented by Chemical Formula 1 below.

[Chemical Formula 1]

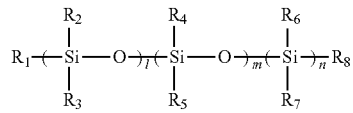

In Chemical Formula 1, each of l, m and n is the same or different and each is independently an integer 0 to 100 (but, l, m and n are not all 0 at the same time); each of $R_1$ to $R_8$ is the same or different and each is independently hydrogen, substituted or unsubstituted $C_1$ to $C_{30}$ alkyl, substituted or unsubstituted $C_2$ to $C_{30}$ alkenyl, substituted or unsubstituted $C_2$ to $C_{30}$ alkynyl, substituted or unsubstituted $C_3$ to $C_{30}$ cycloalkyl, substituted or unsubstituted $C_6$ to $C_{30}$ aryl, substituted or unsubstituted $C_1$ to $C_{30}$ heteroaryl, hydroxyl, alkoxyl, amino, epoxy, carboxyl, halogen, ester, isocyanate, or mercapto; with the proviso that at least two of $R_1$ to $R_8$ include an unsaturated radical that may be polymerized. The aforementioned compound may have a linear or ring structure In the branched copolymer according to an embodiment of the present disclosure, a silicon compound having two or more unsaturated radicals may be represented by Chemical Formula 2 below.

[Chemical Formula 2]

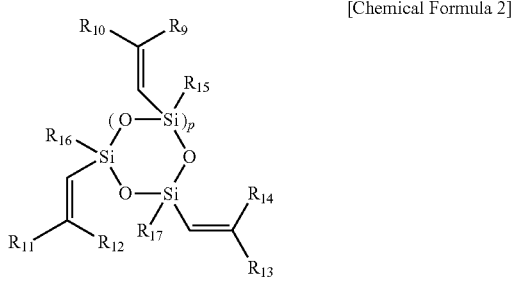

In Chemical Formula 2, each of $R_9$ to $R_{14}$ is the same or different and each is independently substituted or unsubstituted $C_1$ to $C_{20}$ alkyl, substituted or unsubstituted $C_2$ to $C_{20}$ alkenyl, or substituted or unsubstituted $C_6$ to $C_{20}$ aryl; each of $R_{15}$ to $R_{17}$ is the same or different and each is independently hydrogen or substituted or unsubstituted $C_1$ to $C_6$ alkyl; and p is an integer of 1 to 6.

Examples of the aforementioned silicon compound having two or more unsaturated radicals may include without limitation 1,3,5-triisopropyl-1,3,5-trivinyl-cyclotrisiloxane, 1,3,5,7-tetraisopropyl-1,3,5,7-tetravinyl-cyclotetrasiloxane, 1,3,5,7,9-pentaisopropyl-1,3,5,7,9-pentavinyl-cyclopentasiloxane, 1,3,5-tri sec-butyl-1,3,5-trivinyl-cyclotrisiloxane, 1,3,5,7-tetra sec-butyl-1,3,5,7-tetravinyl-cyclotetrasiloxane, 1,3,5,7,9-penta sec-butyl-1,3,5,7,9-pentavinyl-cyclopentasiloxane, 1,3,5-triisopropyl-1,3,5-trimethyl-cyclotrisiloxane, 1,3,5,7-tetraisopropyl-1,3,5,7-tetramethyl-cyclotetrasiloxane, 1,3,5,7,9-pentaisopropyl-1,3,5,7,9-pentamethyl-cyclopentasiloxane, 1,3,5-triisopropyl-1,3,5-triethyl-cyclotrisiloxane, 1,3,5,7-tetraisopropyl-1,3,5,7-tetraethyl-cyclotetrasiloxane, 1,3,5,7,9-pentaisopropyl-1,3,5,7,9-pentaethyl-cyclopentasiloxane, 1,1,3,3,5,5-hexaisopropyl-cyclotrisiloxane, 1,1,3,3,5,5,7,7-octaisopropyl-cyclotetrasiloxane, 1,1,3,3,5,5,7,7,9,9-decaiisopropyl-cyclopentasiloxane, 1,3,5-tri sec-butyl-1,3,5-trimethyl-cyclotrisiloxane, 1,3,5,7-tetra sec-butyl-1,3,5,7-tetramethyl-cyclortetrasiloxane, 1,3,5,7,9-penta sec-butyl-1,3,5,7,9-pentamethyl-cyclopentasiloxane, 1,3,5-tri sec-butyl-1,3,5-triethyl-cyclotrisiloxane, 1,3,5,7-tetra sec-butyl-1,3,5,7-tetraethyl-cyclotetrasiloxane, 1,3,5,7,9-penta sec-butyl-1,3,5,7,9-pentaethyl-cyclopentasiloxane, 1,3,5-triisopropyl-cyclotrisiloxane, 1,3,5,7-tetraisopropyl-cyclotetrasiloxane, 1,3,5,7,9-pentaisopropyl-cyclopentasiloxane, 1,3,5-tri sec-butyl-cyclotrisiloxane, 1,3,5,7-tetra sec-butyl-cyclotetrasiloxane, 1,3,5,7,9-penta sec-butyl-cyclopentasiloxane, 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and the like, and mixtures thereof. In exemplary embodiments, the aforementioned silicon compound having two or more unsaturated radicals may include 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, and/or 1,3,5,7,9-pentaethyl-1,3,5,7,9-pentavinyl-cyclopentasiloxane. In other exemplary embodiments, the aforementioned silicon compound having two or more unsaturated radicals may include 1,3,5,7-tetramethyl-1,3,5,7-tetravinyl-cyclotetrasiloxane.

The aforementioned silicon compound having two or more unsaturated radicals may realize, solely or in a combination with other components, not only matting characteristics that were difficult to be realized by a conventional cross-linking agent, but also realize general properties such as excellent impact resistance and heat resistance. It may also control the degree of cross-linking and polymerization reaction speed of the branched copolymer more easily than a conventional cross-linking agent.

The aforementioned silicon compound having two or more unsaturated radicals may have a weight-average molecular weight of about 150 to about 6,000 g/mol. When the weight average molecular weight of the silicon compound satisfies this range, a cross-linking reaction may be processed and controlled smoothly, thereby realizing excellent matting characteristics.

The branched copolymer may comprise the aforementioned silicon compound having two or more unsaturated radicals in an amount of about 0.1 to about 10 parts by weight, for example about 0.1 to about 8 parts by weight, and as another example about 0.1 to about 5 parts by weight, based on about 100 parts by weight of a monomer mixture that comprises the aromatic vinyl compound and the unsaturated nitrile compound. In some embodiments, the branched copolymer may comprise the silicon compound having two or more unsaturated radicals in an amount of about 0.1, 0.2, 0.3, 0.4, 0.5, 0.6, 0.7, 0.8, 0.9, 1, 2, 3, 4, 5, 6, 7, 8, 9, or 10 parts by weight Further, according to some embodiments of the present invention, the amount of the silicon compound having two or more unsaturated radicals can be in a range from about any of the foregoing amounts to about any other of the foregoing amounts.

When the amount of the silicon compound is within the aforementioned range, it is possible to easily control the degree of cross-linking of the branched copolymer and/or improve matting characteristics with minimal or no deterioration of the impact resistance and/or heat resistance and/or also realize generally constant matting characteristics.

The branched copolymer of the present disclosure may be produced from a mixture that further comprises one or more multifunctional vinyl compounds. Examples of the multifunctional vinyl compounds include without limitation divinyl polydimethylsiloxane, vinyl-modified dimethylsiloxane, divinylbenzene, ethylene glycol di(metha)crylate, allyl (meth)acrylate, diallylphthalate, diallylmalate, triallylisocyanurate, and the like, and mixtures thereof. In exemplary embodiments, the branched copolymer of the present disclosure may include divinyl polydimethylsiloxane and/or vinyl-modified dimethylsiloxane.

The branched copolymer may comprise the multifunctional vinyl compound in an amount of about 0.001 to about 10.0 parts by weight, for example about 0.01 to about 3.0 parts by weight, based on about 100 parts by weight of the monomer mixture that comprises the aromatic vinyl compound and the unsaturated nitrile compound. In some embodiments, the branched copolymer may comprise the multifunctional vinyl compound in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the multifunctional vinyl compound can be in a range from about any of the foregoing amounts to about any other of the foregoing amounts.

When the branched copolymer comprises the multifunctional vinyl compound in an amount within the aforementioned range, the degree of cross-linking and polymerization reaction speed of the branched copolymer can be easily controlled, and the multifunctional vinyl compound in combination with other components may realize matting characteristics with minimal or no deterioration of impact resistance and/or heat resistance.

The branched copolymer of the present disclosure may have a glass transition temperature (Tg) of about 95 to about 115° C. When within this range, the branched copolymer of the present disclosure may realize excellent matting characteristics with minimal or no deterioration of the impact resistance and/or heat resistance of the thermoplastic resin composition that comprises the branched copolymer.

The branched copolymer of the present disclosure may be produced using a common polymerization method such as suspension polymerization and solution polymerization, but without limitation. As an example of the method for producing the branched copolymer, an emulsion polymerization, and a suspension polymerization may be used. When the branched copolymer is produced by the suspension polymerization method, the dispersibility may be improved using an inorganic dispersant and/or organic dispersant. A homopolymer and/or copolymer of acrylic acid or methacrylic acid may be used as the organic dispersant. When using the copolymer as the organic dispersant, the acrylic acid and/or methacrylic acid may be used in an amount of about 50 parts by weight or more based on about 100 parts by weight of the copolymer. Furthermore, the aforementioned acrylic acid and/or methacrylic acid may be in the form of salt of sodium, calcium, and/or ammonium for the solubility of the acrylic acid and/or methacrylic acid.

As a polymerization initiator used in producing the branched copolymer by copolymerization, azobisisobutyronitrile may be used, but without limitation.

The branched copolymer of the present disclosure may be applied to realize matting characteristics of the thermoplastic resin composition, and the thermoplastic resin composition that comprises the branched copolymer may exhibit excellent matting characteristics with minimal or no deterioration of properties of the thermoplastic resin composition such as impact resistance and/or heat resistance.

The present disclosure may also provide a molded product that comprises the thermoplastic resin composition including the branched copolymer. For example, the thermoplastic resin composition including the branched copolymer may be applied to various industrial fields such as various electric electronic products, and automobile components, for example, to automobile interior materials.

The molded product may comprise the silicon compound (C-3) of the branched copolymer (C) in an amount of about 0.01 to about 3 weight %, for example about 0.1 to about 2 weight %, based on the total weight % (100 weight %) of the molded product. In some embodiments, the molded product may comprise the silicon compound (C-3) in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, or 3 parts by weight. Further, according to some embodiments of the present invention, the amount of the silicon compound (C-3) can be in a range from about any of the foregoing amounts to about any other of the foregoing amounts.

When within this range, the molded product may exhibit excellent matting characteristics with minimal or no deterioration of properties such as impact resistance and/or heat resistance.

The gloss of the molded product measured at an angle of 60° according to ASTM D523 may be about 20 to about 60%, for example about 20 to about 55%, and as another example about 20 to about 50%. It was confirmed through numerous tests that the thermoplastic resin composition can help realize excellent properties and/or matting characteristics.

EXAMPLES

Hereinbelow are examples that include test results to prove the excellent effects of the thermoplastic resin composition of the present disclosure.

The specifications of the polycarbonate resin (A), rubber-modified aromatic vinyl copolymer (B), branched copolymer (C), matting agent (D), and aromatic vinyl copolymer (E) used in the examples and comparative examples of the present disclosure are as follows.

(A) Polycarbonate Resin

In the examples and comparative examples of the present disclosure, a bisphenol-A type polycarbonate with a weight-average molecular weight of 25,000 g/mol produced by Cheil Industries Inc. is used.

(B) Rubber-Modified Aromatic Vinyl Copolymer

The rubber-modified aromatic vinyl copolymer (B) used in the embodiments and comparative examples of the present disclosure comprises the following first rubber-modified aromatic vinyl copolymer (B-1) and the following second rubber-modified aromatic vinyl copolymer (B-2).

(B-1) The First Rubber-Modified Aromatic Vinyl Copolymer

In the examples and comparative examples of the present disclosure, an acrylonitrile-butadiene-styrene graft copolymer (g-ABS) containing a rubber polymer having an average particle size of 310 nm and polybutadiene in an amount of 45 weight %, produced by Cheil Industries Inc., is used as the first rubber-modified aromatic vinyl copolymer.

(B-2) The Second Rubber Modified Aromatic Vinyl Copolymer

In the examples and comparative examples of the present disclosure, a SANTAC AT-08 product which is an acrylonitrile-butadiene-styrene copolymer (ABS) resin containing a rubber polymer having an average particle size of 420 nm and polybutadiene in an amount of 15 weight %, produced by Nippon A&L, is used.

(C) Branched Copolymer

In the examples and comparative examples of the present disclosure, a branched copolymer having a glass transition temperature (Tg) of 109.8° C. produced from a mixture that comprises 0.5 parts by weight of Vinyl D-4 product (1,3,5, 7-tetramethyl-1,3,5,7-tetravinyl-cyclotetrasiloxane; molecular weight: 344.7 g/mol) produced by SKC as the silicon compound having two or more unsaturated radicals (C-3), based on 100 parts by weight of a monomer mixture that comprises 71 weight % of aromatic vinyl compound (C-1) and 29 weight % of acrylonitrile compound (C-2), is used.

(D) Matting Agent

The matting agent used in the comparative examples of the present disclosure is a Blendex BMAT product produced by Chemtura.

(E) Aromatic Vinyl Copolymer

The aromatic vinyl copolymer used in the comparative examples of the present disclosure is a styrene-acrylonitrile copolymer (SAN) resin comprising 24 weight % of acrylonitrile and having an average-weight molecular weight of 150,000 g/mol, produced by Cheil Industries Inc.

Each component according to the amount ratios shown in table 1 is added and melt-mixed in a biaxial melt-extruder heated to 250° C. to produce pellets. The pellets are dried at 80° C. for 5 hours or more, and then a specimen for property evaluation is produced using a screw-type catapult heated to 240° C.

TABLE 1

| Component | Unit | Examples | | | | | Comparative examples | | | | | |
|---|---|---|---|---|---|---|---|---|---|---|---|---|
| | | 1 | 2 | 3 | 4 | 5 | 1 | 2 | 3 | 4 | 5 | 6 |
| (A) | weight % | 65 | 65 | 55 | 65 | 50 | 65 | 65 | 55 | 50 | 45 | 60 |
| (B) (B-1) | weight % | 15 | 15 | 15 | 20 | 15 | 15 | 15 | 15 | 25 | 15 | 18 |
| (B-2) | weight % | 5 | 5 | 5 | 10 | 5 | 5 | 5 | 5 | 10 | 5 | 3 |
| (C) | weight % | 15 | 15 | 25 | 5 | 30 | — | — | — | 15 | 35 | 19 |
| (D) | Parts by weight | — | 1.5 | — | — | — | — | 1.5 | — | — | — | — |
| (E) | weight % | — | — | — | — | — | 15 | 15 | 25 | — | — | — |

Specimens obtained by the compositions of the aforementioned table 1 are evaluated for impact strength and gloss. The evaluation results of each item are shown in table 2 below.

Property Evaluation Method (1) Izod impact strength (kgf·cm/cm): Measured using a ⅛" notched specimen at temperatures of 23° C. and −30° C. according to ASTM D256.

(2) Gloss (%): Measured at an angle of 60° by an evaluation method according to ASTM D523 using a BYK-Gardner Gloss Meter produced by BYK.

TABLE 2

| Measured properties | | Examples | | | | | Comparative examples | | | | | |
|---|---|---|---|---|---|---|---|---|---|---|---|---|
| | | 1 | 2 | 3 | 4 | 5 | 1 | 2 | 3 | 4 | 5 | 6 |
| Izod Impact strength | 23° C. | 62 | 60 | 51 | 61 | 52 | 64 | 61 | 52 | 54 | 51 | 50 |
| | −30° C. | 45 | 41 | 38 | 35 | 36 | 46 | 41 | 38 | 38 | 36 | 31 |
| Gloss | 60° | 49 | 25 | 43 | 39 | 39 | 92 | 46 | 93 | 48 | 37 | 49 |

Table 2 shows that thermoplastic resin compositions of examples 1 to 5 of the present disclosure all exhibit excellent impact strength and matting characteristics.

That is, it can be seen that compared to examples 1 to 5 that use the branched copolymer (C) of the present disclosure, comparative examples 1 and 3 that do not use the branched copolymer (C) of the present disclosure have significantly high gloss, and thus extremely low matting characteristics. Although comparative example 2 exhibits relatively high matting characteristics, this is because a matting agent (D) is added, and thus comparative example 2 exhibits similar matting characteristics as examples 1 and 3 of the present disclosure when a matting agent is not added.

Furthermore, it can be seen that in the case of comparative example 4 using 35 parts by weight of rubber-modified aromatic vinyl copolymer (B), which exceeds 30 parts by weight, the upper limit of the rubber-modified vinyl copolymer (B) of the present disclosure, the impact strength is reduced at a room temperature, and matting characteristics are significantly deteriorated.

Furthermore, it can be seen that in the case of comparative example 5 using 35 parts by weight of branched copolymer (C), which exceeds 30 parts by weight, the upper limit of the branched copolymer (C) of the present disclosure, the impact strength is reduced, and in the case of comparative example 6 having a weight ratio of the first rubber-modified aromatic vinyl copolymer (B-1) to the second rubber-modi- fied aromatic vinyl copolymer (B-2) of 6:1, that is outside the range of the present disclosure, the impact strength and matting characteristics are reduced.

Therefore, the aforementioned tests prove that the aforementioned combination of components and amount ratios of the components according to the present disclosure can provide a composition with excellent impact strength and matting characteristics.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A thermoplastic resin composition comprising: (A) a polycarbonate resin; (B) a rubber-modified aromatic vinyl copolymer; and (C) a branched copolymer produced from a mixture that comprises a silicon compound having two or more unsaturated radicals,
   wherein the rubber-modified aromatic vinyl copolymer (B) comprises:
   a first rubber-modified aromatic vinyl copolymer (B-1) comprising a rubber polymer with an average particle size of about 200 to about 400 nm; and
   a second rubber-modified aromatic vinyl copolymer (B-2) comprising a rubber polymer with an average particle size of about 400 to about 800 nm.

2. The composition according to claim 1,
   wherein the mixture comprises the silicon compound having two or more unsaturated radicals (C-3) in an amount of about 0.1 to about 10 parts by weight, based on about 100 parts by weight of a monomer mixture comprising about 60 to about 80 weight % of aromatic vinyl compound (C-1) and about 20 to about 40 weight % of unsaturated nitrile compound (C-2).

3. The composition according to claim 2,
   wherein the silicon compound (C-3) is a compound represented by Chemical Formula 1:

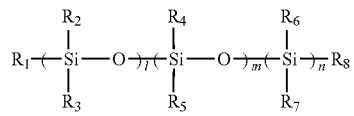

wherein each of l, m and n is the same or different and each is independently an integer of 0 to 100, with the proviso that l, m and n are not 0 at the same time; each of $R_1$ to $R_8$ is the same or different and each is independently hydrogen, substituted or unsubstituted $C_1$ to $C_{30}$ alkyl, substituted or unsubstituted $C_2$ to $C_{30}$ alkenyl, substituted or unsubstituted $C_2$ to $C_{30}$ alkynyl, substituted or unsubstituted $C_3$ to $C_{30}$ cycloalkyl, substituted or unsubstituted $C_6$ to $C_{30}$ aryl, substituted or unsubstituted $C_1$ to $C_{30}$ heteroaryl, hydroxyl, alkoxyl, amino, epoxy, carboxyl, halogen, ester, isocyanate, or mercapto; with the proviso that at least two of $R_1$ to $R_8$ comprise an unsaturated radical that may be polymerized; and wherein the compound has a linear or ring structure.

4. The composition according to claim 2, wherein the silicon compound (C-3) is a compound represented by Chemical Formula 2:

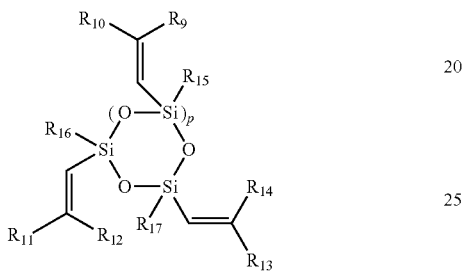

wherein each of $R_9$ to $R_{14}$ is the same or different and each is independently substituted or unsubstituted $C_1$ to $C_{20}$ alkyl, substituted or unsubstituted $C_2$ to $C_{20}$ alkenyl, or substituted or unsubstituted $C_6$ to $C_{20}$ aryl; each of $R_{15}$ to $R_{17}$ is the same or different and each is independently hydrogen or substituted or unsubstituted $C_1$ to $C_6$ alkyl; and p is an integer of 1 to 6.

5. The composition according to claim 4, wherein the silicon compound (C-3) comprises 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, or a mixture thereof.

6. The composition according to claim 2, wherein the branched copolymer (C) is produced by further adding a multifunctional vinyl compound comprising divinyl polydimethylsiloxane, vinyl-modified dimethylsiloxane, divinybenzene, ethylene glycol di(meth)acrylate, allyl(meth)acrylate, diallylphthalate, diallylmalate, triallylisocyanurate, or a mixture thereof, to the mixture.

7. The composition according to claim 2, wherein the aromatic vinyl compound (C-1) comprises styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, or a mixture thereof.

8. The composition according to claim 2, wherein the unsaturated nitrile compound (C-2) comprises acrylonitrile, methacrylonitrile, ethacrylonitrile, phenylacrylonitrile, α-chloroacrylonitrile, fumaronitrile, or a mixture thereof.

9. The composition according to claim 1, wherein the rubber-modified aromatic vinyl copolymer (B) comprises about 25 to about 75 weight % of the first rubber-modified aromatic vinyl copolymer (B-1), and about 25 to about 75 weight % of the second rubber-modified aromatic vinyl copolymer (B-2), each based on the total weight of the rubber-modified aromatic vinyl copolymer (B).

10. The composition according to claim 1, wherein the first rubber-modified aromatic vinyl copolymer (B-1) comprises about 30 to about 60 weight % of the rubber polymer based on the total weight of the first rubber-modified aromatic vinyl copolymer (B-1), and the second rubber-modified aromatic vinyl copolymer (B-2) comprises about 5 to about 20 weight % of the rubber polymer based on the total weight of the second rubber-modified aromatic vinyl copolymer (B-2).

11. The composition according to claim 1, wherein the thermoplastic resin composition comprises about 50 to about 70 weight % of the polycarbonate resin (A), about 20 to about 30 weight % of the rubber-modified aromatic vinyl copolymer (B), and about 1 to about 30 weight % of the branched copolymer (C), each based on the total weight of the thermoplastic resin composition.

12. A molded product produced from the thermoplastic resin composition of claim 1.

13. The molded product according to claim 12, wherein the molded product comprises about 0.01 to about 3 weight % of silicon compound (C-3), based on the total weight of the molded product.

14. The molded product according to claim 12, wherein the molded product has a gloss of about 20 to about 60% measured at an angle of 60° according to ASTM D523.

* * * * *